April 9, 1946.　　　A. WIKSTROM　　　2,397,995
SUBMARINE DETECTOR
Filed March 24, 1943　　2 Sheets-Sheet 1

INVENTOR.
ARNE WIKSTROM
BY
HIS ATTORNEY

April 9, 1946.　　A. WIKSTROM　　2,397,995
SUBMARINE DETECTOR
Filed March 24, 1943　　2 Sheets-Sheet 2

INVENTOR.
ARNE WIKSTROM
BY
HIS ATTORNEY

Patented Apr. 9, 1946

2,397,995

UNITED STATES PATENT OFFICE 2,397,995

SUBMARINE DETECTOR

Arne Wikstrom, Glen Echo Heights, Md.

Application March 24, 1943, Serial No. 480,321
10 Claims. (Cl. 9—9)

(Granted under the act of March 3, 1883, as
amended April 30, 1928; 370 O. G. 757)

This invention relates in general to detecting devices, and particularly is a device intended to locate a submerged submarine when direct visual observation is not possible and then to give a surface indication of such location. It will be obvious, however, from the following description that the detector will function equally well to detect mines, sunken hulls of ships and other objects made of or containing magnetic material; and, therefore, while the invention, in this description, may be termed a submarine detector, this expression is not to be taken as restrictive.

One object of the invention is to produce a submarine detector including a powerful magnet for causing the detector to be attracted to a submerged submarine, and means providing an indication at the surface of the water when a detector has located a submarine.

Another object is to produce a submarine detector adapted to sink in the water, but including a member adapted to float to the surface when a submarine is encountered by the detector.

A further object is to provide in a submarine detector adapted to sink in the water means for causing the device to float after a time lapse whether or not a submarine is encountered by it.

A still further object of the invention is to provide in a submarine detector adapted to sink in the water means for causing the device to float after a certain predetermined depth has been reached by it.

It is also an object of the invention to provide in a submarine detector comprising two members adapted to separate upon the locating of a submarine, a flexible cord or wire for connecting the two members after separation.

Additional objects will be apparent from a reading of the following specification and claims.

In the drawings:

Figure 1 is an elevation of the detector of the invention, showing the same in normal condition, ready for operation, the upper portion thereof being broken somewhat for convenience of illustration.

Figure 2, also in elevation, and including only a portion of the upper end of the detector, illustrates the relations of the parts immediately after contact with a submerged submarine or other magnetic body.

Figure 1:
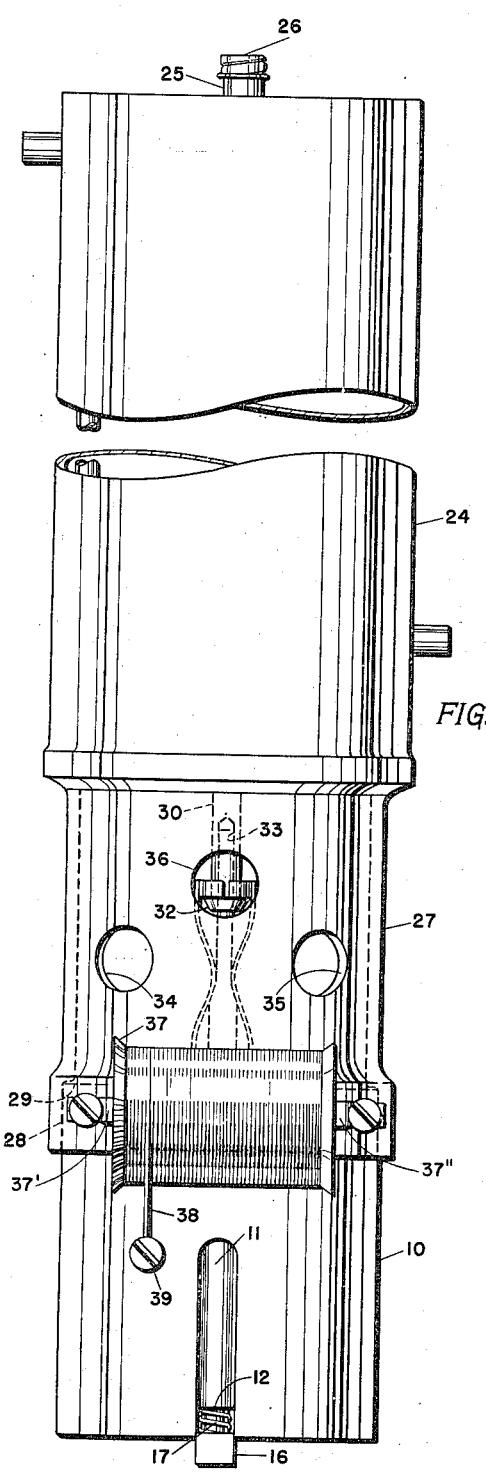
Figure 2:
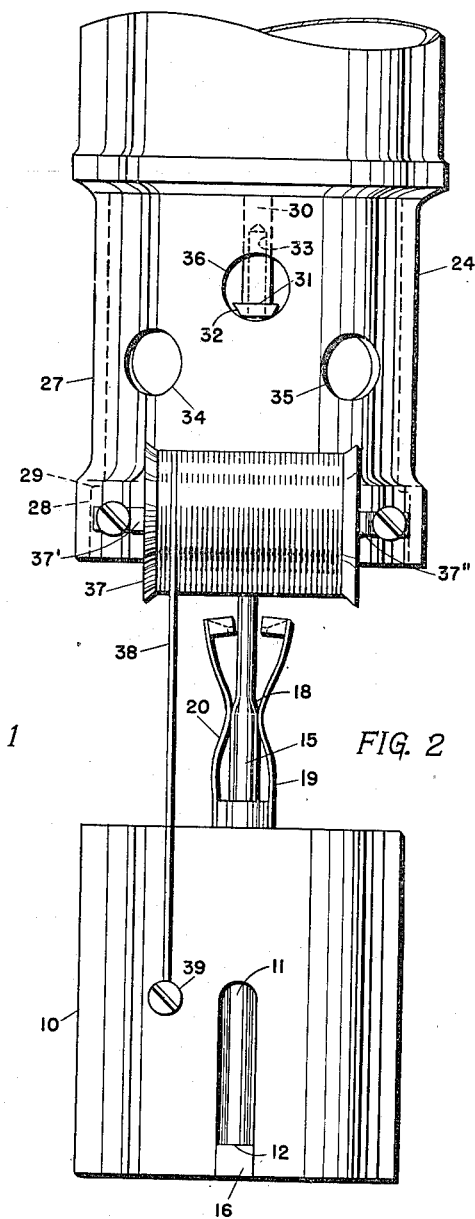
Figure 4:
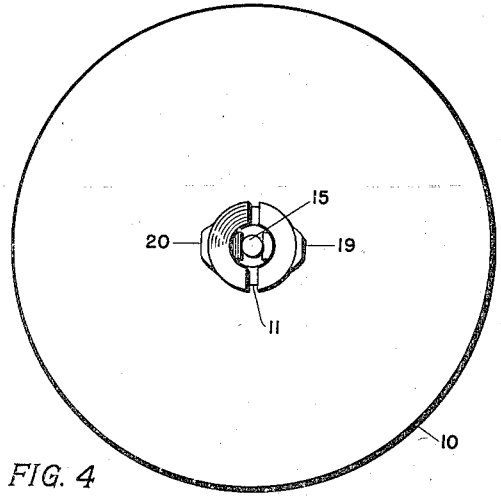
Figure 4 is a top view of the structure of Figure 3.
Figure 5:
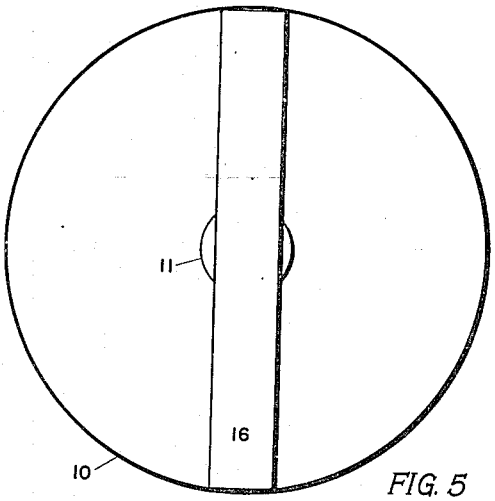
Figure 5 is a bottom view of the structure of Figure 3.

In general, the invention comprises a magnet portion or member, and a float member normally locked to the magnet member by means of a spring-pressed latch, and means for opening the latch when the magnet secures itself to a metal body.

Referring to the drawings, 10 is the magnet which causes the device to be attracted to certain metallic bodies. The magnet shown is of permanent type, and horseshoe in form although substantially cylindrical in section. The horseshoe magnet, with its small air gap, has been found to be most desirable from the standpoint of strength in relation to weight. Preferably, since the greatest possible strength is sought, a permanent magnet of Alnico, an alloy consisting of aluminum, iron, nickel and cobalt, has been used.

Figure 3:
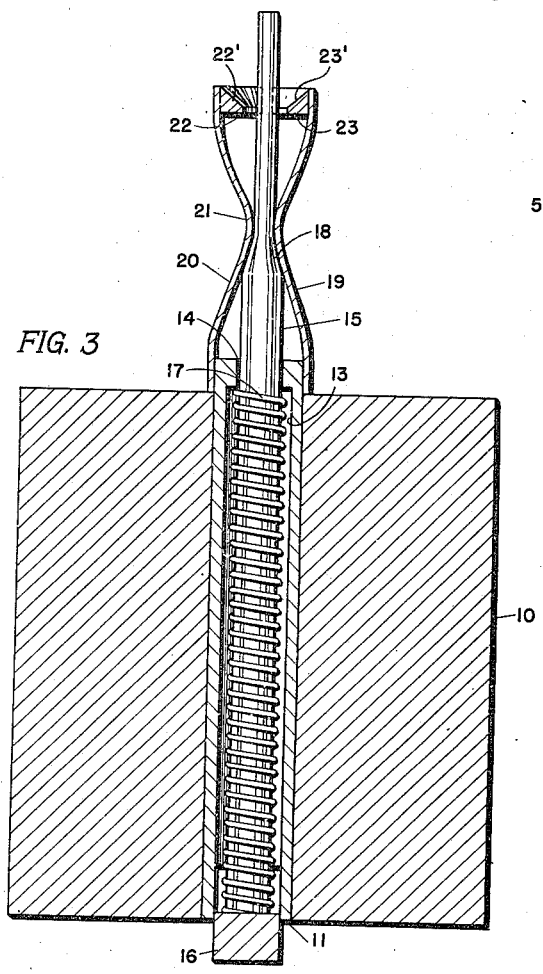
Fig. 3 is a vertical section midway through the magnet used in the invention, and showing also certain elements associated therewith.

Extending vertically through the center of the magnet 10 is a sleeve 11 (see Figure 3), formed of non-magnetic material, such as brass. This sleeve, or at least so much thereof as is in alignment with the air gap, is cut off somewhat short of the bottom of the magnet, as at 12. An opening 13, restricted at 14, may be seen extending vertically through the sleeve.

Arranged for axial movement in the sleeve 11 is a rod 15, the diameter of which is selected to provide an easy sliding fit in the sleeve restriction 14. Secured to the lower end of rod 15 is a member 16, which may be termed a trigger, and this is adapted for sliding movement vertically in the air gap of the magnet, and is, of course, of non-magnetic material. Surrounding rod 15, between trigger 16 and the restriction 14 of sleeve 11, is a spring 17, which functions to maintain rod 15 with trigger 16 in the extended condition shown in Figures 1 and 3.

The diameter of rod 15 decreases above magnet 10, as at 18, and this change in diameter provides a cam action as will be further described.

Secured to sleeve 11, above the magnet, are two spring members 19 and 20. Member 20 is bent inwardly at 21, and then outwardly, and is provided at its upper end with a semicircular latching element 22, with an upper dished surface 22'. Member 19 is formed similarly, and has a latching element 23, with a dished surface 23'. The clearance between members 19 and 20, where they are bent inwardly, is approximately the same as the diameter of rod 15 above the restriction 18, and this point of smallest clearance is located so as normally to be just above the said restriction.

The second principal element of the device comprises a hollow cylinder 24, closed except for an opening 25 in the top thereof. A screw cap 26 is provided for closing the opening.

The lower portion of cylinder 24 is adapted to cooperate with the magnet 10 and latching mechanism associated therewith. Thus, an open-ended cylindrical sleeve 27 is secured to member 24, and the sleeve has formed in the lower portion thereof an enlargement 28 of such size and nature as to receive for free sliding movement therein the upper portion of magnet 10, and to provide a seat 29 to limit the movement of the magnet into the sleeve.

In the center of sleeve 27, and supported from cylinder 24, is a post-like member 30, with a circular enlargement or flange 31 on the lower end thereof somewhat larger than the opening through latch members 22 and 23 when the same are in closed relation, but smaller than the opening therethrough when the latch members are open. Flange 31 is tapered at 32. Post 30 is bored out in its center, at 33, to receive the upper end of rod 15 of the magnet assembly.

The manner in which the parts fit together will be readily apparent. With the parts of the magnet and latching structure in the relations shown in Figure 3, this structure is merely slid into opening 28 in sleeve 27. The top of rod 15 enters opening 33 in member 30 and aids in guiding the parts together. The tapered flange 31 cooperates with the dished surfaces 22' and 23' of latch members 22 and 23 to force these members apart so that they pass easily over the flange. Springs 19 and 20 then close the latch members above the flange. With the lower flat surfaces of the latch members resting on the upper flat surface of the flange 31, the elements are securely fastened together.

It will be understood that, in addition to the sleeve 11 and trigger 16, the various other elements of the structure—with the exception of the magnet itself—are formed of non-magnetic material.

In use, these devices are intended to be strewn relatively thickly over an area in which an object sought to be discovered is believed to be located. Since the devices sink slowly, and since the magnetic elements are very strong, it is likely, if the object sought really is within the suspected area, that one or more of the detectors will be attracted thereby. Assuming that one is so attracted, it will fasten itself to the body, and in so doing will force the trigger 16 upwardly against the action of spring 17. Movement of the trigger of course produces a like movement of rod 15, and enlargement 18 thereof is forced between the spring members 19 and 20, thereby opening the latches 22 and 23, whereupon the freed buoyant body 24 floats to the surface.

Openings 34, 35 and 36 are provided in sleeve 27, in order that no difference in pressure above and below the magnet 10 may tend to prevent easy disengagement of the buoyant cylinder 24.

Secured to the upper portion of the detector is a spool 37, which is adapted to rotate freely in the brackets 37' and 37", and this spool contains a fine wire 38, one end of which is secured to magnet element 10, as by screw 39. As will be apparent, this arrangement provides a connection between the buoyant body 24 and any submarine or other magnetic body to which element 10 may have secured itself.

The exact indicating means to be used in connection with the device is not a part of this invention, but certain possibilities will be pointed out. For use in daylight and in restricted areas, the floating cylinder itself, especially if brightly painted, may provide enough of a signal. For night operation, an upwardly directed light may be provided in body 24, with a battery, and a switch actuated by withdrawal of rod 15, or by some other convenient means.

Figure 6:
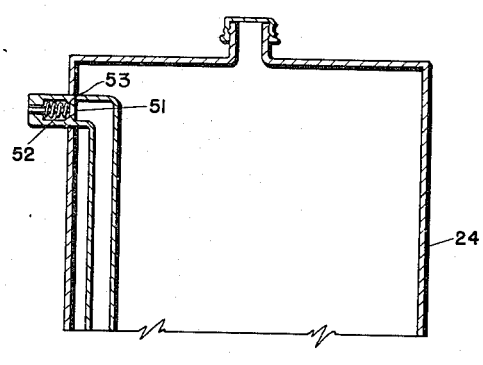
Figure 6 is a sectional view of a portion of the buoyant member of the invention, illustrating the means for refloating a detector.
Figure 6:
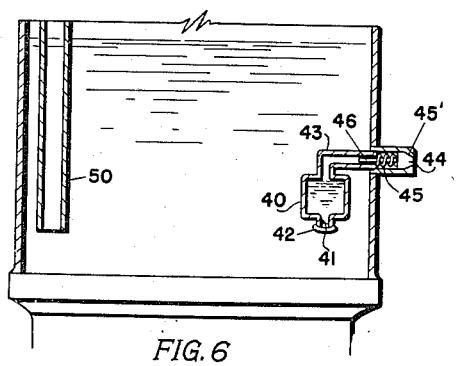

As so far described, the detector of this invention will sink in the water, and the buoyant member 24 will float to the surface only if and when a submarine or other magnetic body is encountered by the detector. Since the devices are to be used in large quantities, however, they will represent considerable expense, notwithstanding the unit cost is small. Under some combat conditions, therefore, and in salvaging operations, it will be desirable to collect and re-use the detectors. The means for accomplishing this end are illustrated in Figure 6.

The structure of the device is fundamentally just as has been described. The weights of the elements are proportioned somewhat differently, however, so that, with cylinder 24 empty, the detector will float rather than sink. Liquid ballast, which may be a solution of sodium carbonate, is then introduced through the opening 25 in a quantity sufficient to give the detector a negative buoyancy, and cap 26 is screwed on.

In the lower part of cylinder 24 is a flask or chamber 40, with a small opening 41 at the bottom thereof, the opening normally being sealed by a small pellet 42 of wax or other suitable material. The top of flask 40 communicates with the exterior of cylinder 24 through a pipe or tube 43, in the outer, enlarged, end of which is arranged a pressure-sensitive piston 44, which acts against a spring 45. A seat 45' is provided for the piston, to limit its outward movement. A rod 46, in the tube 43, serves as a guide for the piston. The piston is substantially watertight, no matter what its position. The flask 40 is filled with sulphuric acid.

Extending from the lower part of cylinder 24 to the top portion thereof is a pipe or tube 50, which also communicates with the exterior of cylinder 24. The outer end of the pipe contains a valve 51 which acts—in a direction opposite to piston 44—against a spring 52. A seat 53 is provided for the valve.

The action of this arrangement is simple. As the detector sinks in the water, piston 44 is gradually pressed inwardly, increasing the pressure on the acid in flask 40. When the pressure rises sufficiently, pellet 42 will be forced off opening 41, and the acid will be introduced slowly into the sodium carbonate solution, thereby to decompose the solution, and free carbon dioxide gas. The action continues, and becomes increasingly fast as pressure on piston 44 increases. At some point, when the pressure inside chamber 24 is greater than that outside, the liquid ballast will be driven out through pipe 50 and valve 51. The detector, with its magnetic element still attached, then will rise to the surface.

For ease in differentiating between a detector that has located a submarine, and one that has not, valves, ballast, etc., are so calculated that there will be a definite, prolonged, time lapse between the return to the surface of the former and the latter. Further, of course, when smoke or light signals are combined with the detector, such signals are to be actuated only in the event that the buoyant member has become separated from the magnetic element.

By varying the size of opening 41, and the nature and means for securing thereto pellet 42, the blowing of the ballast can readily be made to depend primarily on either depth or duration of submersion.

The foregoing description is in specific terms; and for the true scope of the invention, reference should be had to the appended claims.

This invention may be manufactured and/or used by or for the Government of the United States of America without the payment of any royalty thereon or therefor.

I claim:

1. A device of the character described including a magnet element for automatic engagement with a body containing magnetic material, a buoyant member, releasable means normally securing the buoyant member to the magnet element and means releasing said securing means upon engagement of the magnet element with said body.

2. A device of the character described including a magnet element adapted to secure itself to a body containing magnetic material, a latching member on said element, a buoyant element and a latching member thereon adapted normally to cooperate with the first mentioned latching element to secure the buoyant element to the magnet element, and means operative upon the securing of the magnet element to a body containing magnetic material for unlatching the normally cooperating latching elements.

3. A device of the character described including an element for automatic engagement with a body containing magnetic material, a buoyant member, releasable means normally securing the buoyant member to said element, and a trigger actuated by engagement of said element with a body for releasing said securing means.

4. A device of the nature described including a magnet having a surface for securing the magnet to a body containing magnetic material, a trigger normally projecting beyond said surface and adapted to be actuated when the magnet is secured to a body, and a buoyant body normally fixed to said magnet but adapted to be released upon the actuation of said trigger.

5. A device of the character described including a magnet having a surface for securing the magnet to a body containing magnetic material, a buoyant body, spring closed latching means normally securing the buoyant body to the magnet, a trigger normally spring pressed beyond the said magnet surface but adapted to be moved substantially flush with said surface when the magnet is secured to a body containing magnetic material, and means cooperating with said trigger for opening the latching means when the trigger is moved.

6. In a device of the character described, a buoyant member having a lower cylindrical portion open at the bottom, a magnet element in said cylindrical portion adapted to secure itself to an object containing magnetic material, means for normally securing together said member and said element, means for releasing said securing means, and means for equalizing pressure above and about said element.

7. A structure according to claim 1, further characterized by means for ballasting the device, and means actuated by pressure external of said device for blowing the ballast.

8. A structure according to claim 1, further characterized by means for ballasting the device with a liquid ballast, and means actuated by pressure external of said device for producing pressure above said liquid ballast for driving the same out of said device.

9. A structure according to claim 1, further characterized by means for ballasting the device with a liquid ballast, an outlet for said ballast, a valve for said outlet, said valve being normally closed but adapted to be opened by an increase in pressure on said ballast, and means actuated by pressure external of said device for increasing the pressure on said ballast.

10. A structure according to claim 1, further characterized by a flexible extensible connection between the buoyant member and the magnet element.

ARNE WIKSTROM.